United States Patent [19]
Takeuchi et al.

[11] Patent Number: 5,828,523
[45] Date of Patent: Oct. 27, 1998

[54] ROTARY HEAD CYLINDER DEVICE

[75] Inventors: Hiroaki Takeuchi, Tenri; Tohru Okuda, Nara, both of Japan

[73] Assignee: Sharp Kabushiki Kaisha, Osaka, Japan

[21] Appl. No.: 802,513

[22] Filed: Feb. 20, 1997

[30] Foreign Application Priority Data

Feb. 22, 1996 [JP] Japan ................................. 8-034687

[51] Int. Cl.$^6$ ................................................. G11B 5/584
[52] U.S. Cl. ........................................... 360/107; 360/109
[58] Field of Search ................................ 360/109, 107, 360/108, 77.16

[56] References Cited

U.S. PATENT DOCUMENTS

| | | | |
|---|---|---|---|
| 4,882,635 | 11/1989 | Sanai ....................................... | 360/109 |
| 5,432,658 | 7/1995 | Kajita et al. ............................. | 360/109 |
| 5,694,273 | 12/1997 | Takeuchi ................................. | 360/109 |

OTHER PUBLICATIONS

K. Yoji, Japanese Laid–Open Patent Publication No. 5-081631-A, Laid Open on Apr. 2, 1993.
Japanese Laid–Open Patent Publication No. 5-8486, Laid Open on Feb. 2, 1993.
H. Takeuchi, et al., "High Performance DTF Control System: Precision DTF Control System Using Movable Head", Paper for Lecture at Spring Meeting of Institute of Precision Engineering, 1996, pp. 1071–1072.
H. Takeuchi et al., "High Performance DTF Control System; Precision DTF Control System and Head Stand–by System During Non–Scanning Period", Paper for Regular Lecture in Kansai Area of Institute of Precision Engineering, 1996, pp. 37–38.
H. Takeuchi, et al., "Precision DTF Control System Using Observer and Modified Observer", 39th Lecture of Federation of Automatic Control, Oct. 18, 1996, pp. 91–92.

*Primary Examiner*—Robert S. Tupper
*Attorney, Agent, or Firm*—David G. Conlin; William J. Daley, Jr.

[57] ABSTRACT

A closed magnetic circuit is formed in a rotary drum by first and second yokes of a soft magnetic material and a permanent magnet. In addition, a drive coil is provided in a gap provided between the first and second yokes so as to cross a magnetic flux running in the closed magnetic circuit. The first yoke is supported by a parallel leaf spring so as to be movable along the axis of the rotary drum. An electromagnetic force is applied to the first yoke in the direction of the axis of the rotary drum by applying a control current to the drive coil. The first yoke can be shifted in this manner to a position where the electromagnetic force balances the reaction force of the parallel leaf spring. In this manner, the closed magnetic circuit generates a sufficient drive force and eliminate a leak magnetic flux that affects a head or a transformer. Moreover, the movable portion is light-weighted, and the following frequency of a dynamic tracking operation is improved, compared to a case where all the closed circuit section is disposed with a movable portion of the parallel leaf spring.

15 Claims, 15 Drawing Sheets

ROTARY HEAD CYLINDER DEVICE

FIELD OF THE INVENTION

The present invention relates to a rotary head cylinder device incorporating a dynamic tracking mechanism for allowing magnetic heads to follow a track curve.

BACKGROUND OF THE INVENTION

In recent years, rotary head cylinder devices employ a smaller track width for higher density recording than before. However, such a smaller track width causes reproduced signals to be noticeably affected by tracking deviation in which the center of a magnetic head deviates from the center of a track, thereby making it impossible to obtain a sufficient reproduction output.

The tracking deviation results mainly from a track curve formed when a signal is recorded. So necessary tracking precision should be ensured for the track curve of the narrow track. A well-known technique used for this purpose is a dynamic tracking technique according to which a magnetic head is mounted on an actuator that can shift in the track width direction so that the magnetic head can follow the track curve.

Typical dynamic tracking mechanisms are, for example, a bimorph piezoelectric actuator, a moving coil type electromagnetic actuator and a moving magnet type electromagnetic actuator. The moving magnet type electromagnetic actuator needs no power supply mechanism constituted of a slip ring and a brush, and is especially very suitable for rotary head cylinder devices incorporating a drum of a high speed rotation of recent years.

FIGS. 14 and 15 show an example of a conventional rotary head cylinder device provided with a mechanism similar to the dynamic tracking mechanism of a moving magnet type disclosed in Japanese Publication for Examined Patent Application No. 5-8486/1993 (Tokukohei 5-8486).

In the rotary head cylinder device 250, magnetic heads 201a and 201b are mounted together on a head base 203, as will be explained in detail later. The dynamic tracking operation in the rotary head cylinder device 250 is performed to the two magnetic heads 201a and 201b simultaneously. The following description will explain the rotary head cylinder device 250 in detail.

The rotary head cylinder device 250 includes a fixed drum 230 and a rotary drum 240 that can rotate relative to the fixed drum 230. The rotary drum 240 forms a single unit with a rotation shaft 221 supported by bearings 223 disposed at a boss portion of the fixed drum 230, and thereby can rotate together with the rotation shaft 221. A magnetic tape (not shown) is attached around the fixed drum 230 and the rotary drum 240, covering 180° of the outer circumferential surfaces thereof.

First and second ring-shaped leaf springs 205a and 205b, sandwiching a fixing member 211 and being separated from each other by a predetermined distance, are fixed to the rotary drum 240. The first and second leaf springs 205a and 205b constitute a parallel leaf spring 205.

On the movable side of the parallel leaf spring 205 is sandwiched a yoke 213 of a soft magnetic material to which a permanent magnet 207 is fixed. The permanent magnet 207 and the yoke 213 function as a movable portion 208 of the parallel leaf spring 205.

The head base 203 is fixed to the movable portion 208. The magnetic heads 201a and 201b are fixed to a tip of the head base 203. The magnetic heads 201a and 201b are disposed so as to have a level difference equivalent to one track pitch in the height direction, and simultaneously scan over the magnetic tape covering 180° of the outer circumferential surface of the rotary drum 240.

A stator side transformer 231 is fixed to the fixed drum 230, while a rotor side transformer 233 is fixed to the rotary drum 240. The stator side transformer 231 and the rotor side transformer 233 transmit signals from the magnetic heads 201a and 201b and external signals. A stator 236, around which a drive coil 215 is wound, is fixed to the fixed drum 230.

Next, the following description will explain an operation by the dynamic tracking mechanism. As shown in FIG. 16(a), the yoke 213 is made up of three regions 213a through 213c. The permanent magnet 207 is fixed to the inner circumferential side of the region 213c. The region 213a is formed parallel to the top surface of the permanent magnet 207 so as to keep a constant distance from the top surface of the permanent magnet 207. The region 213b is formed parallel to the bottom surface of the permanent magnet 207 so as to keep a constant distance from the bottom surface of the permanent magnet 207.

A segment of a magnetic flux originating at the north pole of the permanent magnet 207 is absorbed into the regions 213a and 213b of the yoke 213, passes through the region 213c and returns to the permanent magnet 207 at the south pole thereof. The rest of the magnetic flux passes through the drive coil 215, spreads three-dimensionally and, at last, returns to the permanent magnet 207 at the south pole thereof.

With such a configuration, the magnetic flux passing through the drive coil 215 has a component in the radial direction of the drive coil 215. Therefore, when the drive coil 215 is energized, the permanent magnet 207 receives an electromagnetic force of a vertical direction.

Consequently, the movable portion 208 shifts to a position where the electromagnetic force balances the reaction force of the parallel leaf spring 205. Therefore, the height of the magnetic heads 201a and 201b attached to the movable portion 208 can be controlled by applying a control electric current to the drive coil 215. That is, the dynamic tracking operation can be performed.

However, the conventional technique has the following problems:
(1) The magnetic circuit for generating a drive force (electromagnetic force) does not form a closed magnetic path in the dynamic tracking mechanism.
(2) Wiring is difficult between the magnetic heads and the rotor side transformer.

The following description will explain these problems in detail.
(1) The problem of the magnetic circuit:

In the conventional dynamic tracking mechanism, as shown in FIG. 16(a), the magnetic circuit does not form a closed magnetic path, since there is no yoke facing a magnetic pole (north pole) of the permanent magnet 207. In other words, a segment of the magnetic flux originating at the permanent magnet 207 is absorbed into the regions 213a and 213b, and the rest passes through the drive coil 215 while spreading three-dimensionally.

The magnetic flux absorbed into the regions 213a and 213b produces no sufficient drive force, because the density of the magnetic flux effectively crossing the drive coil 215 (density of the magnetic flux in the radial direction of the rotary drum 240) is low. Meanwhile, the magnetic flux passing through the drive coil 215 and spreading three-dimensionally is a leak magnetic flux, affecting the magnetic heads 201a and 201b and the rotary transformers 231 and 233 in an undesirable manner.

A method of resolving such a problem is to use a yoke of a soft magnetic material as the stator 236 around which the drive coil 215 is wound. In this case, the yoke 213, the permanent magnet 207 and the stator 236 form a closed magnetic path as shown in FIG. 16(b). However, since the stator 236 is fixed to the fixed drum 230, when the permanent magnet 207 rotates with a rotary drum 240, an eddy current occurs to the stator 236 due to an a.c. magnetic flux, and causes a loss in the rotation torque of the rotary drum 240.

(2) The problem of the wiring:

In the conventional configuration shown in FIGS. 14 through 16, the stator 236 of an L-like shape in cross-section is fixed to the outer circumferential edge of the fixed drum 230. That is, the stator 236 is disposed between the magnetic heads 201a and 201b and the rotor side transformer 233. As a result, the wire linking the magnetic heads 201a and 201b to the rotor side transformer 233 must be routed to run around the stator 236. The wiring route D shown in FIG. 17, a wiring route example linking the magnetic heads 201a and 201b to the rotor side transformer 233, is very complex and unreliable.

SUMMARY OF THE INVENTION

An object of the present invention is to offer a rotary head cylinder device with a better following frequency in a dynamic tracking operation, which is capable of producing a sufficient drive force in a dynamic tracking mechanism and restraining a leak magnetic flux.

In order to achieve the above object, a rotary head cylinder device in accordance with the present invention is a rotary head cylinder device for recording and/or reproducing a signal with respect to a recording medium while moving a magnetic head provided to a rotor along a rotation axis of the rotor, the rotor including:

a permanent magnet for generating a magnetic flux;

a first yoke, made of a magnetic material, for supporting the magnetic head and being a part of a magnetic circuit in which the magnetic flux generated by the permanent magnet runs;

a leaf spring for supporting the first yoke so that the first yoke can move along the rotation axis of the rotor; and a second yoke made of a magnetic material and fixed so as to outwardly face the first yoke and to be separated from the first yoke by a gap, wherein the rotary head cylinder device includes a drive coil fixed so that the axial line of the drive coil agrees with the rotation axis of the rotor, and so that the drive coil cross the magnetic flux running in the magnetic circuit composed of the first and second yokes and the permanent magnet.

The rotary head cylinder device includes a closed magnetic circuit composed of the first and second yokes disposed with the rotary device, and the permanent magnet directly or indirectly fixed to the rotor, and the drive coil is disposed so as to orthogonally cross the magnetic flux running in the closed magnetic circuit. Therefore, the magnetic flux effectively crosses the drive coil, and a sufficient drive force is obtained in the dynamic tracking operation. In addition, since the closed magnetic circuit is formed, there occurs no leak magnetic flux affecting the magnetic head and the rotary transformer in an undesirable manner.

Moreover, the yoke constituting the closed magnetic circuit is divided into the first yoke and the second yoke, and only the first yoke functions as the moveable portion of the parallel leaf spring. Consequently, the weight of the movable portion in the dynamic tracking mechanism can be reduced, and the following frequency of the dynamic tracking operation can be improved.

Furthermore, all the elements composing the closed magnetic circuit rotate together as a single unit. Therefore, there occurs no eddy current causing a loss torque with respect to the rotation of the rotary drum.

In a preferred embodiment of the rotary head cylinder device in accordance with the present invention, the leaf spring is two ring-shaped leaf springs constituting a parallel leaf spring, and the first yoke is supported by the parallel leaf spring so as to be movable along the rotation axis of the rotor.

In this manner, the first yoke is sandwiched at the top surface and the bottom surface thereof by the parallel leaf spring. As a result, the shift direction is limited only to the direction of the axis of the rotor, and it is possible to increase the rigidity in the other directions.

In another preferred embodiment of the rotary head cylinder device in accordance with the present invention, the rotor further includes a rotor side transformer electrically connected to the magnetic head; and a stator side transformer provided so as to face the rotor side transformer, the rotor side transformer being fixed to the rotor on the outer circumferential side of the drive coil.

In this manner, the rotor side transformer is fixed to the rotor on the outer circumferential side of the drive coil. Consequently, the wiring route between the magnetic head and the rotor side transformer is shorter, thereby increasing reliability of the wiring.

For a fuller understanding of the nature and advantages of the invention, reference should be made to the ensuing detailed description taken in conjunction with the accompanying drawings.

DESCRIPTION OF THE EMBODIMENTS

[FIRST EMBODIMENT]

The following description will discuss an embodiment in accordance with the present invention.

Figure 1:
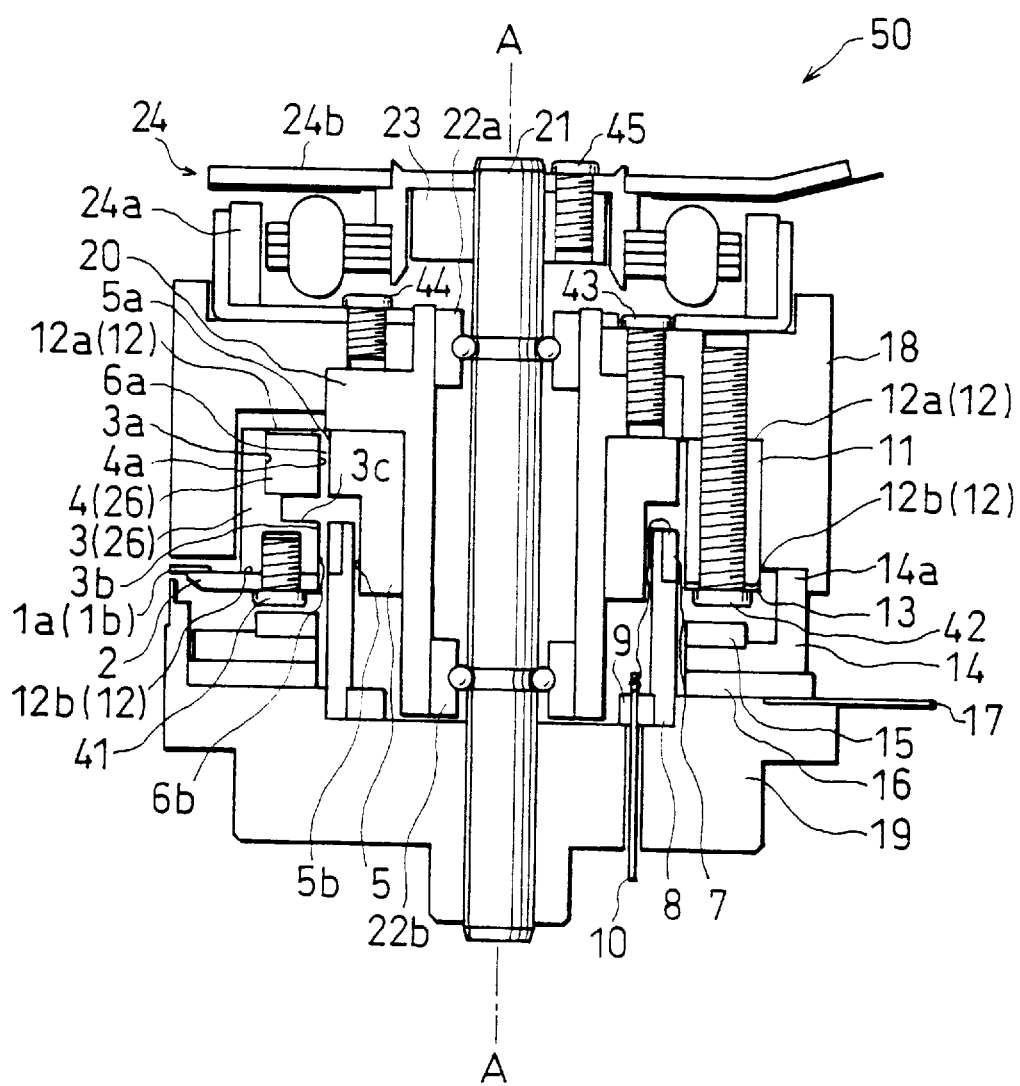
FIG. 1, illustrating an embodiment in accordance with the present invention, is a cross-sectional view showing a configuration of a rotary head cylinder device.

As mainly shown in FIG. 1, a rotary head cylinder device of the present embodiment has a fixed drum 19, a shaft 21 whose axial line is shown as A—A, a rotary disk 20, a rotary drum 18 and a motor 24. In the following description, the outer circumferential side of the axial line A—A will be simply referred to as the outer circumferential side, whereas the inner circumferential side thereof will be simply referred to as the inner circumferential side.

The shaft 21 is fixed to the center of the fixed drum 19 with, for example, a press insertion technique or shrinkage fitting technique. The shaft 21 supports outer bearings 22a and 22b so that the outer bearings 22a and 22b can rotate freely. A rotary disk 20 is fixed to the outer circumferential surfaces of the outer bearings 22a and 22b. The rotary disk 20 is supported so as to rotate freely around the shaft 21. A rotary drum 18 is fixed to the top surface of the rotary disk 20 by a screw 43. Note that the rotor disclosed in the claims is composed of the rotary drum 18 and the rotary disk 20.

A rotor 24a of the motor 24 is fixed to the top surface of the rotary drum 18 by a screw 44. A motor fixing stand 23 is fixed to the shaft 21, while a stator 24b of the motor 24 is fixed to the motor fixing stand 23 by a screw 45. The rotary drum 18 and the rotary disk 20 are rotated around the axial line A—A by a rotation drive force of the motor 24, while the fixed drum 19 does not move.

Magnetic heads 1a and 1b are disposed to and rotate together with the rotary drum 18, scanning over a magnetic tape covering 180° of the outer circumferential surface of the rotary drum 18.

Next, the following description will discuss the movable mechanism that allows the magnetic heads mounted on the rotary drum 18 so as to move in a track width direction and follow a track curve. As shown in FIG. 1, to the rotary drum 18 are attached a first yoke 3 of a soft magnetic material, a permanent magnet 4, a fixed member 11, and first and second ring-shaped leaf springs 12a and 12b.

Figure 2:
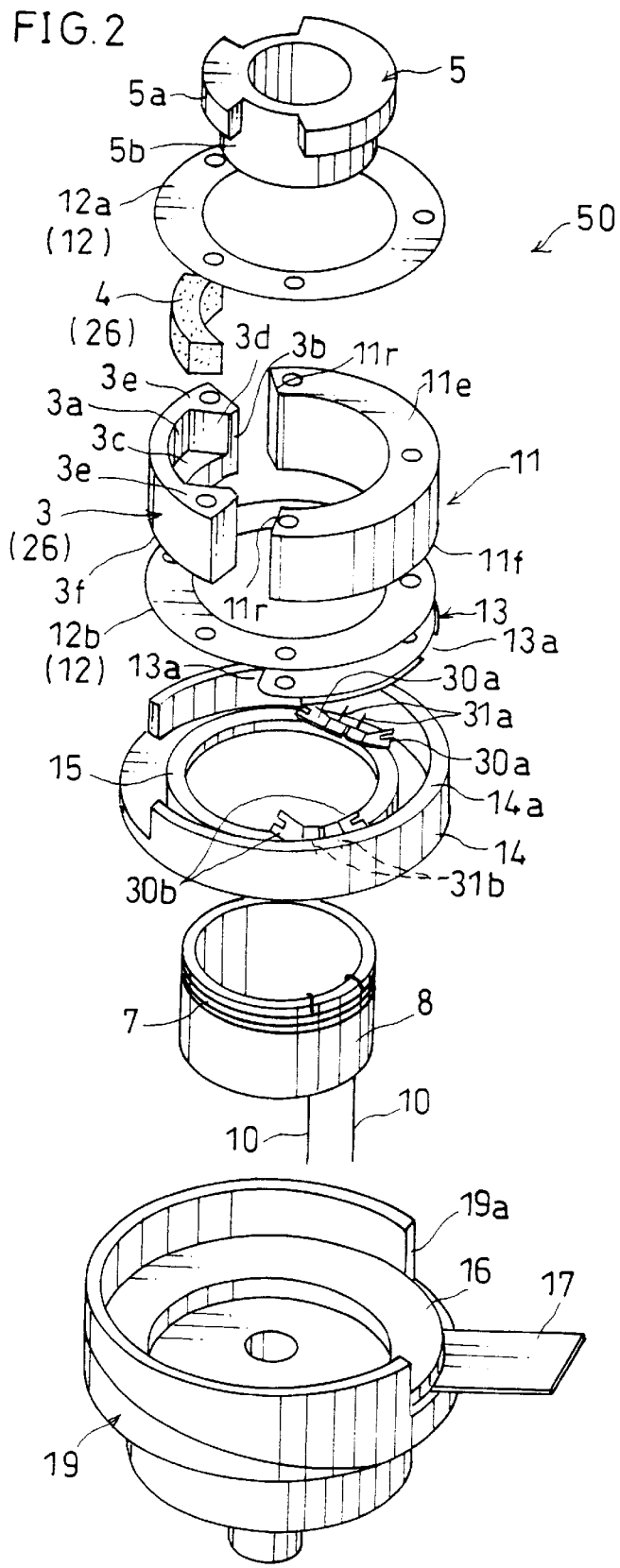
FIG. 2 is a perspective view showing a configuration of a disassembled main part of the rotary head cylinder device.

As shown in FIG. 2, the permanent magnet 4 has an arc-like axis in the circumferential direction of the rotary drum 18 and a rectangular-like cross-section with respect to the axis. In the present embodiment, the permanent magnet 4 has its north pole on the inner circumferential side and its south pole on the outer circumferential side. However, the poles may be arranged oppositely.

The first yoke 3, to which the permanent magnet 4 is fixed, is a block of a sector-like shape with a concave portion into which the permanent magnet 4 is inserted. The first yoke 3 has a first surface 3a, a second surface 3b, a fifth surface 3c, two sixth surfaces 3d, a top reference surface 3e and a bottom reference surface 3f. The first surface 3a, to which the permanent magnet 4 is fixed, is a surface on the outer circumferential side of the concave portion. The second surface 3b is a surface on the inner circumferential side. The sixth surfaces 3d are end surfaces in the circumferential direction of the concave portion. The fifth surface 3c is a bottom surface of the concave portion. The top reference surface 3e and the bottom reference surface 3f are a top surface and a bottom surface of the first yoke 3 respectively.

The permanent magnet 4 is disposed so as to keep a constant distance from the fifth surface 3c and the sixth surfaces 3d of the first yoke 3. In the following description, the permanent magnet 4 combined with the first yoke 3 as a single unit will be referred to as a movable member 26.

The fixed member 11 is a block of a sector-like shape and has a top reference surface 11e and a bottom reference surface 11f. The top reference surface 11e and the bottom reference surface 11f are a top surface and a bottom surface of the fixed member 11, and has the same height as the top reference surface 3e and the bottom reference surface 3f of the first yoke 3 respectively.

A second yoke 5 is fixed to the rotary disk 20 by, for example, a screw and adhesive. A portion of the second yoke 5 facing the permanent magnet 4 is expanded outwardly. The surface of that expanded portion directly opposite the permanent magnet 4 is referred to as the third surface 5a. The surface of the second yoke 5 facing the second surface 3b of the first yoke 3 is referred to as the fourth surface 5b.

The first and second leaf springs 12a and 12b constitute a parallel leaf spring 12 and function as leaf springs that support the first yoke 3 in such a manner that the first yoke 3 can move freely in the A—A direction. The first and second leaf springs 12a and 12b sandwich the movable member 26 and the fixed member 11. The parallel leaf spring 12 sandwiches the movable member 26, using the top and bottom reference surfaces 3e and 3f of the first yoke 3 as references, and also sandwiches the fixed member 11, using the top and bottom reference surfaces 11e and 11f of the fixed member 11 as references. The fixed member 11, together with the first and second leaf springs 12a and 12b and a later-described relay substrate 13, are fixed to the rotary drum 18 by a screw 42.

With such a configuration, the movable member 26 functions as a movable portion of the parallel leaf spring 12 that is fixed at an end portion 11r in the circumferential direction of the fixed member 11, and therefore can shift along the axial line A—A shown in FIG. 1. This mechanism is called a movable mechanism.

Figure 6:
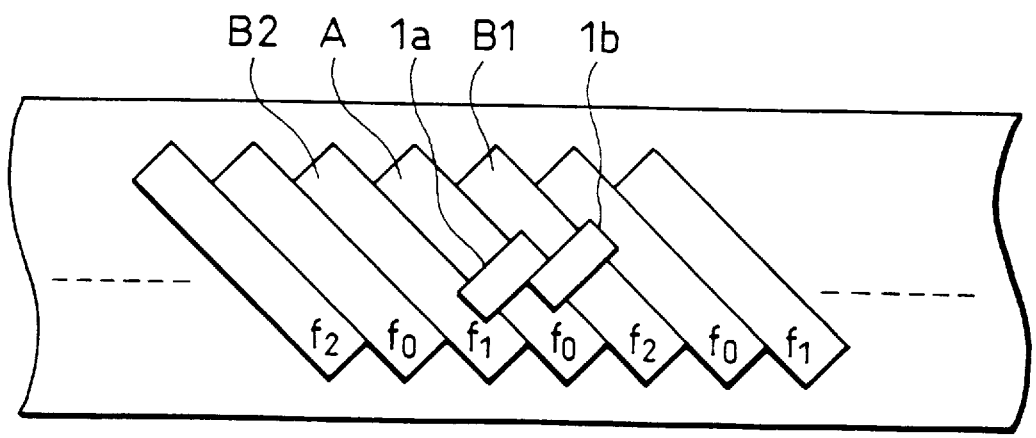
FIG. 6 is an explanatory drawing showing a track pattern on a magnetic tape.

A head base 2, to which the magnetic heads 1a and 1b are fixed, is fixed to the movable member 26 of this movable mechanism at the first yoke 3 by the screw 41 via the leaf spring 12b as shown in FIG. 1. The magnetic heads 1a and 1b are disposed so as to have, respectively, a level difference equivalent to one track pitch in the A—A direction, and simultaneously scan over the magnetic tape covering 180° of the outer circumferential surface of the rotary drum 18 as shown in FIG. 6. Electrode surfaces 2a and 2b on the head base 2 shown in FIG. 3 are electrically connected to respective coils of the magnetic heads 1a and 1b.

The relay substrate 13 is fixed to the fixed member 11 via the leaf spring 12b. The relay substrate 13 has almost the same plan view with the fixed member 11, and is fixed, together with the fixed member 11, the first and second leaf springs 12a and 12b, to the bottom surface of the rotary drum 18 by the screw 42.

Figure 3:
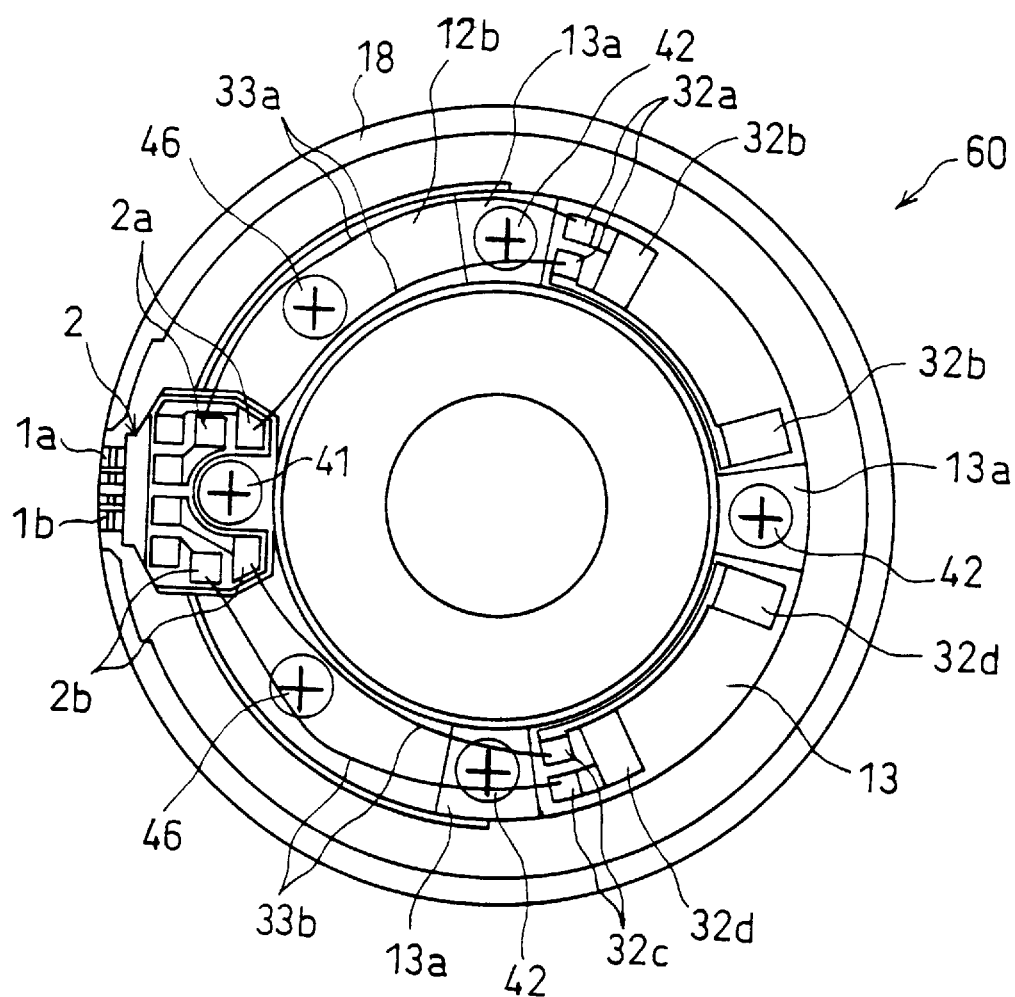
FIG. 3 is a bottom view showing a configuration of a rotary drum assemble body of the rotary head cylinder device.

The relay substrate 13, as shown in FIG. 3, has electrode surfaces 32a through 32d. The electrode surfaces 32a and 32b are electrically connected to each other, while the electrode surfaces 32c and 32d are electrically connected to each other. The electrode surface 32a is connected to the electrode surface 2a on the head base 2 via a slightly loose lead wire 33a. The electrode surface 32c is connected to the electrode surface 2b on the head base 2 via a slightly loose lead wire 33b. Since the relay substrate 13 is fixed at its concave portion 13a by the screw 42, the head of the screw 42 does not interrupt wiring of the lead wires 33a and 33b.

A rotor side transformer 14 is fixed to the rotary drum 18 to which the movable mechanism is provided. As shown in FIGS. 1 and 2, the rotor side transformer 14 includes a ring-shaped portion and an outer circumferential portion 14a standing out from the ring-shaped portion, except where the magnetic heads 1a and 1b are disposed in the rotary drum 18. The rotor side transformer 14 is fixed to the outer circumferential edge of the rotary drum 18 at the outer circumferential portion 14a by, for example, adhesive.

A terminal stand 15 is fixed to the inner circumferential side of the rotor side transformer 14. Two terminals 30a and 30b of a leaf spring type are provided on the top surface of the terminal stand 15. The terminal 30a is electrically connected to a terminal 31a, while the terminal 30b is electrically connected to a terminal 31b. The coil of the rotor side transformer 14 is connected to the terminals 31a and 31b of the terminal stand 15.

By attaching the rotor side transformer 14 to the rotary drum 18, the terminal 30a of a leaf spring type is pressed to the electrode surface 32b of the relay substrate 13, and the terminal 30b of a leaf spring type is pressed to the electrode surface 32d of the relay substrate 13. With this configuration, the coils of the magnetic heads 1a and 1b are electrically connected to the coil of the rotor side transformer 14.

As described above, a rotary drum assemble body 60 is made up by attaching the movable mechanism and the rotor side transformer 14 to the rotary drum 18.

A coil bobbin 8 and a stator side transformer 16 are attached to the fixed drum 19. A drive coil 7 is wound around the coil bobbin 8. A terminal stand 9 is attached to the coil bobbin 8 and has terminals 10. Each of the terminals 10 is connected to the drive coil 7 on one side thereof and sticks out of the fixed drum 19 on the other. A substrate 17 of, for example, Flexible Printed Circuits (FPC) is attached to the stator side transformer 16, and sticks out of an open portion 19a provided to the cylindrical portion of the fixed drum 19. The stator side transformer 16 is disposed so that the top surface of the stator side transformer 16 faces the bottom surface of the rotor side transformer 14 fixed to the rotary drum 18.

Next, the following description will discuss a dynamic tracking mechanism of a rotary head cylinder device 50 configured as above. A dynamic tracking mechanism 70 is constituted of the movable mechanism attached to the rotary drum 18, the second yoke 5 attached to the rotary disk 20, the coil bobbin 8 attached to the fixed drum 19, and the drive coil 7.

Figure 4A:
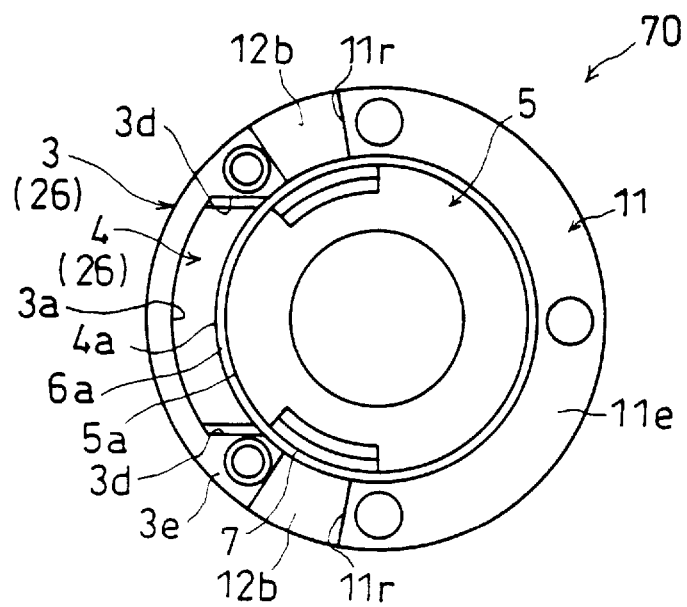
FIG. 4(a) is a top view showing a configuration of a dynamic tracking mechanism of the rotary head cylinder device.
Figure 4B:
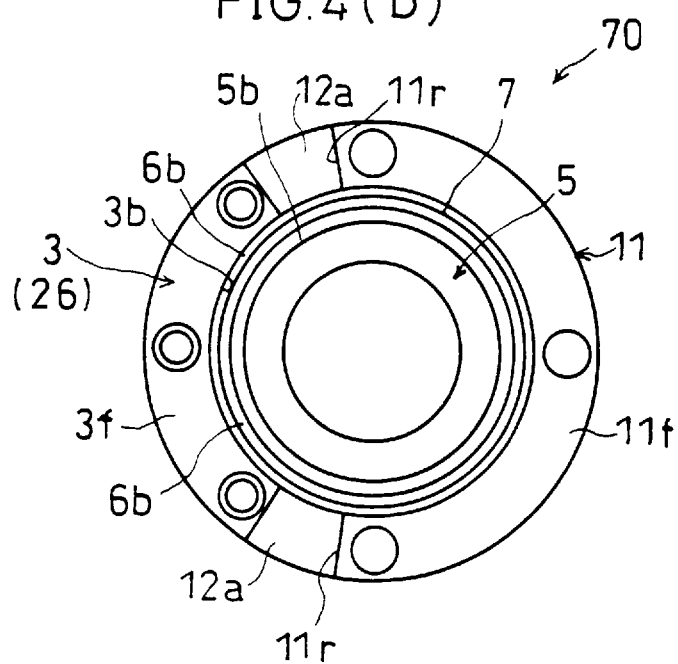
FIG. 4(b) is a bottom view showing a configuration of the dynamic tracking mechanism of the rotary head cylinder device.

As shown in FIGS. 1 and 4(a), the magnetic pole (north pole) 4a on the inner circumferential side of the permanent magnet 4 faces the third surface 5a of the second yoke 5, being separated from the third surface 5a by a first gap 6a. Also, as shown in FIGS. 1 and 4(b), the second surface 3b on the first yoke 3 faces the fourth surface 5b of the second yoke 5, being separated from the fourth surface 5b by a second gap 6b.

Figure 5:
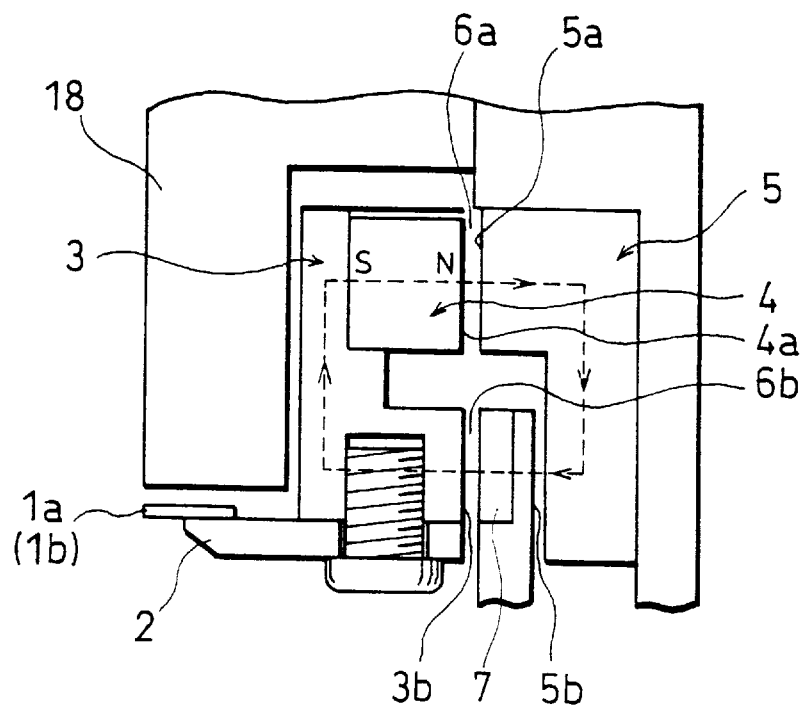
FIG. 5 is an explanatory drawing showing a configuration of a magnetic circuit of the dynamic tracking mechanism.

In this manner, the permanent magnet 4, the first yoke 3 and the second yoke 5 constitute the following magnetic circuit. As indicated by broken lines in FIG. 5, a magnetic flux generated by the magnetic pole 4a is absorbed into the third surface 5a of the second yoke 5, passes through the second yoke 5 and then exits at the fourth surface 5b. Moreover, the magnetic flux, after exiting at the fourth surface 5b, is absorbed into the second surface 3b of the first yoke 3, passes through the first yoke 3 and then returns to the magnetic pole (south pole) on the outer circumferential side of the permanent magnet 4. In this manner, the magnetic circuit of the rotary head cylinder device of the present embodiment constitutes a closed magnetic path. Also, the coil bobbin 8 around which the drive coil 7 is wound is inserted to the second gap 6b so as not to touch the first yoke 3 and the second yoke 5. The coil bobbin 8 is disposed at a place where the drive coil 7 crosses the magnetic flux generated at the second gap 6b.

With such a configuration, since the third surface 5a of the second yoke 5 is expanded outwardly as described earlier, the first gap 6a is very narrow, thereby considerably reducing the magnetic reluctance of the magnetic circuit. In such a closed magnetic circuit, a concentrated magnetic flux travelling normal to the direction of the electric current of the drive coil 7 (i.e., travelling in a radial direction of the rotary drum 18) crosses the drive coil 7 disposed in the second gap 6b. This is because of the provision of the second yoke 5 having a surface facing the magnetic pole 4a of the permanent magnet 4 and the second surface 3b of the first yoke 3.

With this configuration, as the drive coil 7 is provided with a power supply via the terminals 10 from outside the fixed drum 19 as shown in FIG. 1, the second surface 3b of the first yoke 3 receives an electromagnetic force. The electromagnetic force is applied in the direction of the axial line A—A in FIG. 1. Since the movable member 26 composed of the first yoke 3 and the permanent magnet 4 is a movable portion of the parallel leaf spring 12, the movable member 26 shifts to a position where the electromagnetic force balances the reaction force of the parallel leaf spring 12. Therefore, the magnetic heads 1a and 1b mounted on the movable member 26 also shift along the axial line A—A. That is, the dynamic tracking operation can be performed.

In this configuration, the permanent magnet 4, the first yoke 3 and the second yoke 5 composing the magnetic circuit rotate together as a single unit. Therefore, the configuration allows no a.c. magnetic flux to be generated in the magnetic circuit, and therefore there occurs no eddy current causing a loss torque with respect to the rotation of the rotary drum 18.

Next, the following description will discuss a dynamic tracking control operation with the dynamic tracking mechanism described above. The present embodiment will explain a dynamic tracking control operation using, for example, a double frequency pilot signal method.

As shown in FIG. 6, in the double frequency pilot signal method, pilot signals f1 and f2 of different frequencies are recorded together with a main signal. The pilot signals f1 and f2 are recorded alternately and separated from an adjacent pilot signal by a track where no pilot signal is recorded (indicated as f0 in FIG. 6).

The magnetic heads 1a and 1b simultaneously scan over the magnetic tape and thus read signals from tracks. Here, as shown in FIG. 6, it is assumed that the magnetic head 1a scans a track A where no pilot signal is recorded, and the magnetic head 1b scans a track B1 adjacent to the track A. The magnetic head 1a scanning the track A where no pilot signal is recorded reads the pilot signals f1 and f2 as a cross talk component from the tracks B1 and B2 adjacent to the track A. A relative positioning error between the track A and the magnetic head 1a is detected by comparing levels of the read-out pilot signals f1 and f2.

Figure 7:
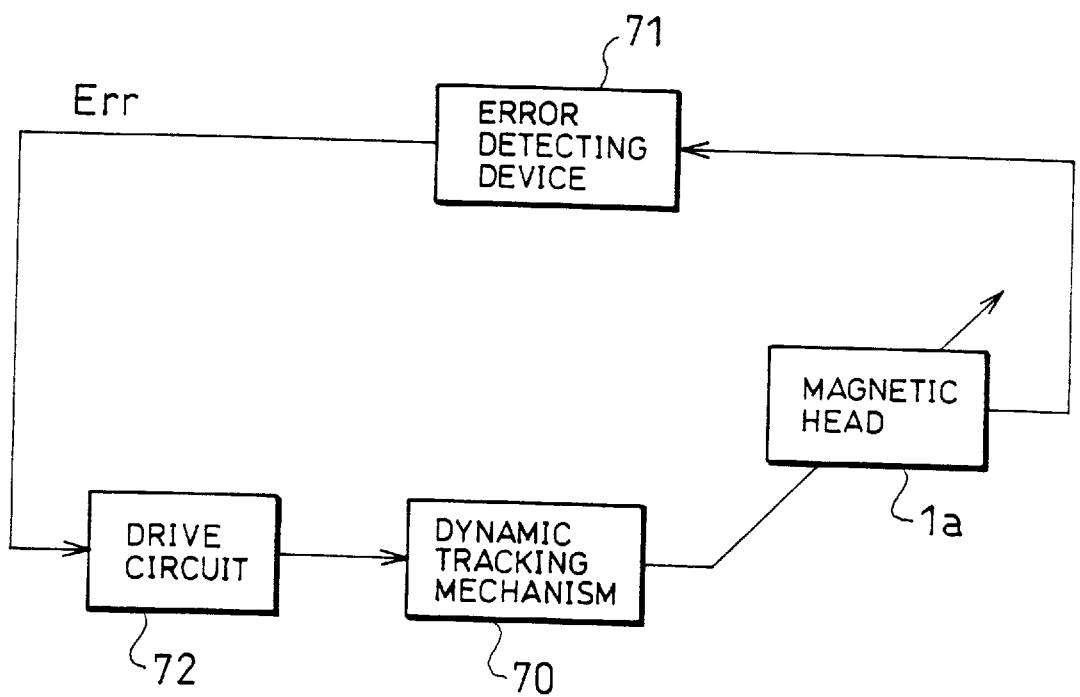
FIG. 7 is a block diagram illustrating a control operation of a dynamic tracking control by the rotary head cylinder device shown in FIG. 1.

FIG. 7 is a block diagram illustrating a control operation of the dynamic tracking control. An error detecting device 71 in FIG. 7 detects the relative positioning error and then outputs a relative positioning error signal Err. The relative positioning error signal Err is inputted to the dynamic tracking mechanism 70 via a drive circuit 72. Note that the input section of the dynamic tracking mechanism 70 refers to the input section of the drive coil 7, and also that the drive circuit 72 is composed of an amplifier, a phase correction circuit, a filter, etc.

With such a closed loop control, the rotary head reproduction device of the present embodiment enables the magnetic head 1a attached to the movable member 26 of the dynamic tracking mechanism 70 to follow a track curve of the track A. The magnetic heads 1a and 1b are disposed so as to have a level difference equivalent to one track pitch in the A—A direction (see FIG. 1). Since both magnetic heads 1a and 1b are mounted on the same movable member 26, when the magnetic head 1a follows the track A, the magnetic head 1b automatically follows the track B1.

The description so far has explained the double frequency pilot signal method as a detecting method of the relative positioning error signal. However, it is needless to mention that any other detecting method may be employed, such as a quadruple frequency pilot signal method and a wobbling method.

Next, the following description will discuss a transmission route for a signal read by the magnetic heads 1a and 1b from the track on the magnetic tape. Although the following description will only deal with a transmission route for a signal read by the magnetic head 1a, the same description holds true for the magnetic head 1b.

As shown in FIG. 3, the coil of the magnetic head 1a is connected to the electrode surface 2a on the head base 2. The electrode surface 2a is connected to the lead wire 33a and the electrode surface 32a of the relay substrate 13 fixed to the fixed member 11. The electrode surface 32a of the relay substrate 13 is electrically connected to the electrode surface 32b. That is, the coil of the magnetic head 1a is electrically connected to the electrode surface 32b of the relay substrate 13. In addition, the coil of the rotor side transformer 14 is connected to the terminal 31a of the terminal stand 15, while the terminal 31a is electrically connected to the terminal 30a of a leaf spring type. Since the terminal 30a of a leaf spring type is pressed to the electrode surface 32b of the relay substrate 13, the coil of the magnetic head 1a is electrically connected to the coil of the rotor side transformer 14.

The rotor side transformer 14 and the stator side transformer 16 face each other, keeping a small gap therebetween. The rotor side transformer 14 and the stator side transformer 16 constitute a rotary transformer capable of transmitting a signal. The coil of the stator side transformer 16 is connected to an electrode surface (not shown) of the substrate 17. Therefore, a signal read by the magnetic head 1a is transmitted via the lead wire 33a, the relay substrate 13, the rotor side transformer 14 and the stator side transformer 16, and transmitted externally at the substrate 17. With such a configuration, wiring with a lead wire exists only between the head base 2 and the relay substrate 13. Therefore, the wiring route is short, simple, and a reliable wiring is possible.

As described so far, in the rotary head cylinder device of the present embodiment, since the movable member 26 is composed of a part of the magnetic circuit in the dynamic tracking mechanism, the weight of the movable member can be reduced. The following frequency can be improved during the dynamic tracking operation in this manner.

Moreover, since the magnetic circuit forms a closed magnetic path, an efficient magnetic flux crosses the drive coil. Therefore, a sufficient drive force is obtained in the dynamic tracking operation. In addition, there occurs no leak magnetic flux affecting the magnetic heads and the rotary transformer in an undesirable manner.

Furthermore, all the elements composing the magnetic circuit rotate together as a single unit. Therefore, there occurs no eddy current causing a loss torque with respect to the rotation of the rotary drum.

Besides, the rotor side transformer is fixed on the outer circumferential side of the rotary drum. Therefore, even in a rotary head cylinder device provided with a dynamic tracking mechanism, the wiring route is short and simple between the magnetic heads and the rotor side transformer, and a reliable wiring is possible.

Note that in the first embodiment so far discussed, the permanent magnet 4 is fixed to the first yoke 3. However, the weight of the movable member 26 can be further reduced by fixing the permanent magnet 4 to the second yoke 5. The following second embodiment will discuss a rotary head cylinder device having a configuration where the permanent magnet 4 is fixed to the second yoke 5.

[SECOND EMBODIMENT]

The following description will discuss a rotary head cylinder device of the second embodiment. Here, for convenience, referring to FIGS. 8 through 11, arrangement and elements of the second embodiment that are the same as in the rotary head cylinder device mentioned in the first embodiment are indicated by the same reference numerals and description thereof is omitted.

The rotary head cylinder device of the present embodiment differs from that of the first embodiment in the configuration of the dynamic tracking mechanism. The following description will discuss this difference.

The dynamic tracking mechanism 140 is composed of a movable mechanism attached to a rotary drum 18, a permanent magnet 104 and a second yoke 105 attached to a rotary disk 20, and a coil bobbin 8 and a drive coil 7 attached to a fixed drum 19.

Figure 8:
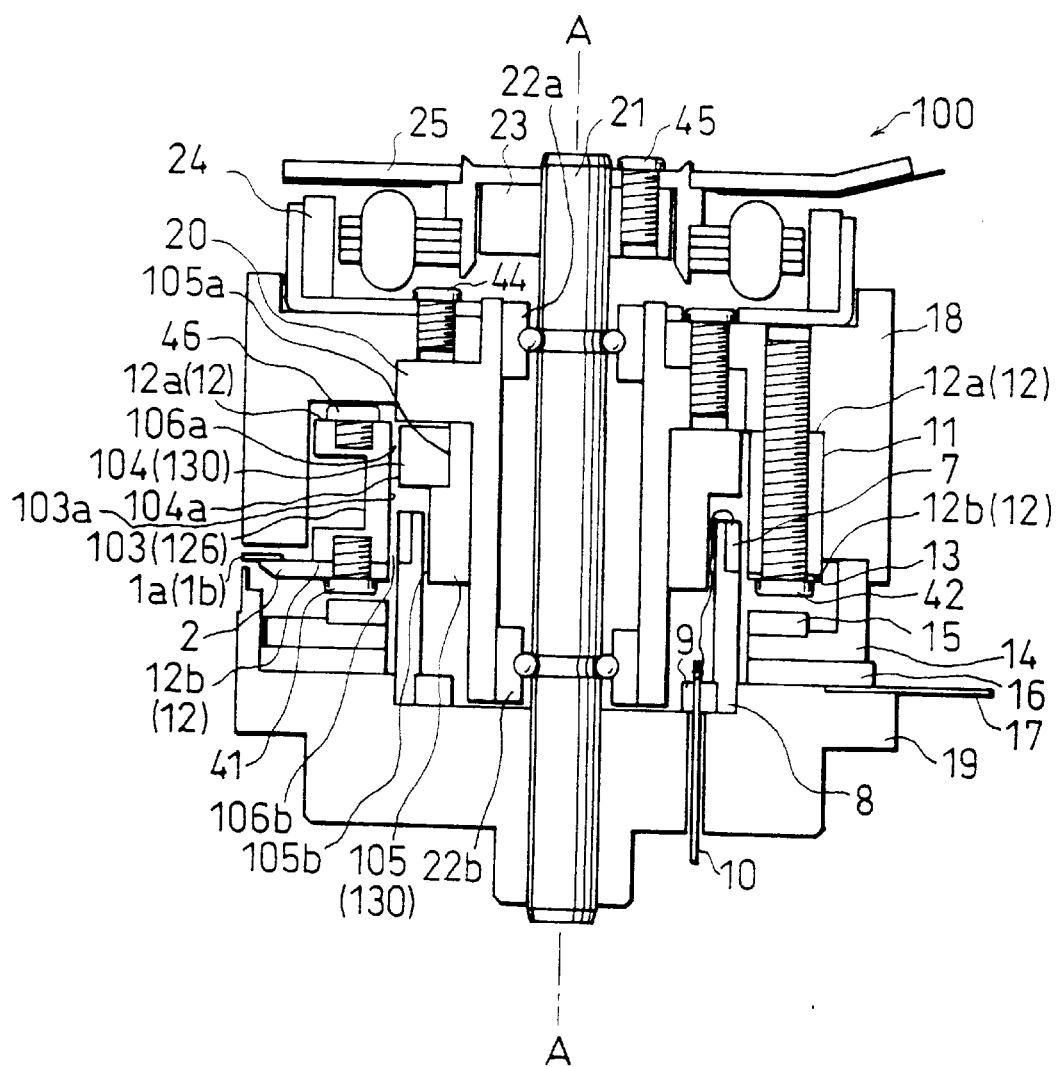
FIG. 8, illustrating another embodiment in accordance with the present invention, is a cross-sectional view showing a configuration of a rotary head cylinder device.
Figure 9:
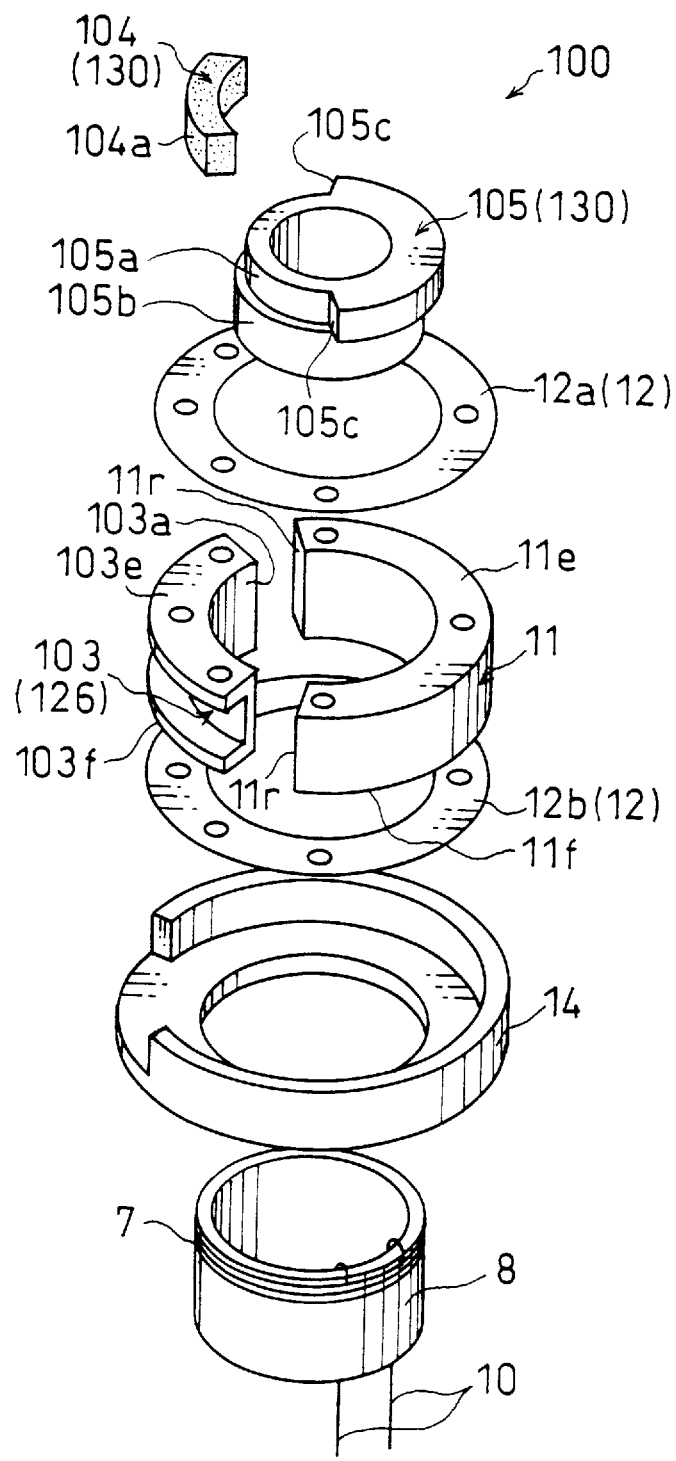
FIG. 9 is a perspective view showing a configuration of a disassembled main part of the rotary head cylinder device.
Figure 10:
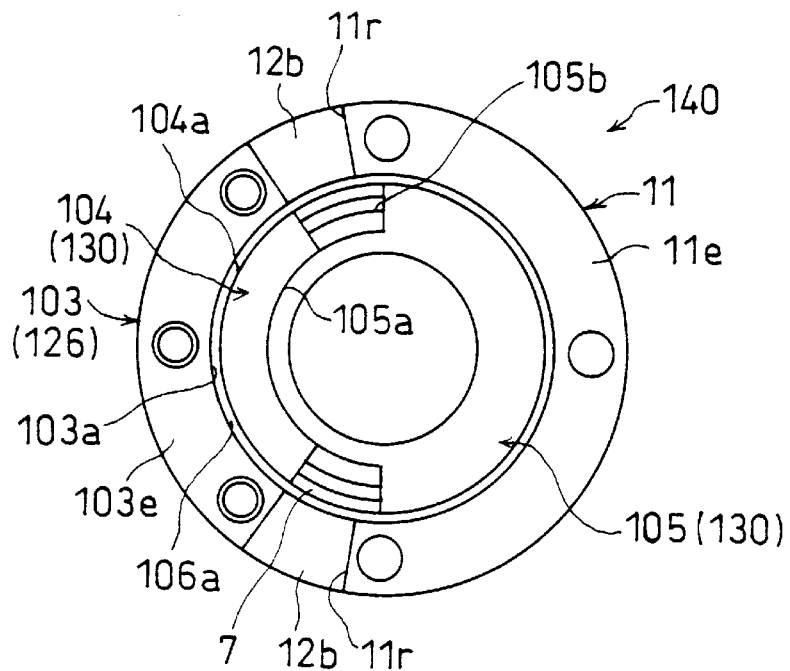
FIG. 10 is a plan view showing a configuration of a dynamic tracking mechanism of the rotary head cylinder device.

The movable mechanism will be explained first. The movable mechanism, as shown in FIG. 8 through 10, is composed of a first yoke 103, a fixed member 11, and a first and second ring-shaped leaf springs 12a and 12b. The first yoke 103 is a sector-shaped block of a U-shaped radial cross-section, and has a surface 103a, a top reference surface 103e and a bottom reference surface 103f. In the following description, the first yoke 103 will be referred to as a moving member 126 for convenience.

The fixed member 11 is a block of the same sector shape as in the first embodiment, and has a top reference surface 11e and a bottom reference surface 11f. The leaf springs 12a and 12b sandwich the movable member 126 and the fixed member 11, and constitute a parallel leaf spring 12. The parallel leaf spring 12 sandwiches the movable member 126, using the top and bottom reference surfaces 103e and 103f of the moveable member 126 as references, and also sandwiches the fixed member 11, using the top and bottom reference surfaces 11e and 11f of the fixed member 11 as references. The fixed member 11, together with the first and second leaf springs 12a and 12b and a relay substrate 13, are fixed to the rotary drum 18 by a screw 42.

With such a configuration, the movable member 126 functions as a movable portion of the parallel leaf spring 12 that is fixed at an end portion 11r of the fixed member 11, and therefore can shift along the axial line A—A shown in FIG. 8. This mechanism is called a movable mechanism.

The second yoke 105 is fixed to the rotary disk 20 by, for example, a screw and adhesive. The second yoke 105 is a block with a concave portion into which the permanent magnet 104 is inserted, and has a third surface 105a, a fourth surface 105b and seventh surfaces 105c. The permanent magnet 104 is fixed to the third surface 105a which is an inner circumferential surface of the concave portion. The fourth surface 105b is an outer surface of the second yoke 105. The seventh surfaces 105c are side surfaces in the circumferential direction of the concave portion. The surface 103a of the first yoke 103 faces the fourth surface 105b and the permanent magnet 104 fixed to the third surface 105a of the second yoke 105. Therefore, an area of the surface 103a facing the permanent magnet 104 is the first surface disclosed in claim 4, and a portion thereof facing the fourth surface 105b is the second surface thereof. The permanent magnet 104 is disposed so as to keep a distance from the seven surfaces 105c of the second yoke 105. In the following description, the permanent magnet 104 and the second yoke 105 will be referred to as an assembly body 130. The assembly body 130 is formed so that the magnetic pole 104a on the outer circumference side of the permanent magnet 104 is located outside of the fourth surface 105b of the second yoke 105.

The coil bobbin 8 around which the drive coil 7 is wound is attached to the fixed drum 19 in the same manner as in the first embodiment 1. A terminal stand 9 is attached to the coil bobbin 8 and has terminals 10. Each of the terminals 10 is connected to the drive coil 7 on one side thereof and sticks out of the fixed drum 19 on the other.

Figure 11:
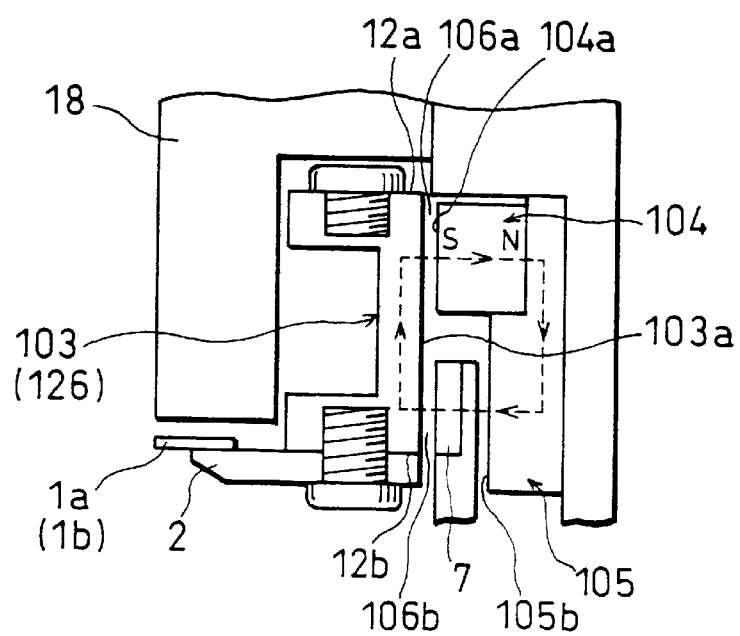
FIG. 11 is an explanatory drawing showing a configuration of a magnetic circuit of the dynamic tracking mechanism.

In the configuration of the present embodiment, the surface 103a of the first yoke 103 faces the magnetic pole 104a of the permanent magnet 104, being separated from the magnetic pole 104a by a first gap 106a. The surface 103a also faces the surface 105b of the second yoke 105, being separated from the surface 105b by a second gap 106b. That is, the first yoke 103, the second yoke 105 and the permanent magnet 104 form a magnetic circuit. The drive coil 7 is disposed to be in the second gap 106b. FIG. 11 is an enlarged view of the magnetic circuit shown in FIG. 8. Although FIG. 11 shows the magnetic pole 104a on the outer circumferential side of the permanent magnet 104 as the south pole, the poles of the permanent magnet 104 may be arranged oppositely.

As indicated by broken lines in FIG. 11, the magnetic circuit composed of the first yoke 103, the permanent magnet 104 and the second yoke 105 forms a closed magnetic path. Here, since the magnetic pole 104a of the permanent magnet 104 swells towards the outer circumferential side, the first gap 106a is very narrow, thereby considerably reducing the magnetic reluctance of the magnetic circuit. In such a closed magnetic circuit, a concentrated magnetic flux travelling normal to the direction of the electric current of the drive coil 7 (i.e., travelling in a radial direction of the rotary drum 18) crosses the drive coil 7 disposed in the second gap 106b.

With this configuration, as the drive coil 7 is provided with a power supply via the terminals 10 from outside the fixed drum 19 as shown in FIG. 8, a part of the surface 103a of the first yoke 103 facing the fourth surface 105b of the second yoke 105 receives an electromagnetic force. The electromagnetic force is applied in the direction of the axial line A—A in FIG. 8. Since the movable member 126 composed of the first yoke 103 is a movable portion of the parallel leaf spring 12, the movable member 126 shifts to a position where the electromagnetic force balances the reaction force of the parallel leaf spring 12. Therefore, magnetic heads 1a and 1b mounted on the movable member 126 also shift along the axial line A—A in FIG. 8. That is, the dynamic tracking operation can be performed.

In this configuration, the first yoke 103, the permanent magnet 104 and the second yoke 105 composing the magnetic circuit rotate together as a single unit. Therefore, the configuration allows no a.c. magnetic flux to be generated in the magnetic circuit, and therefore there occurs no eddy current causing a loss torque with respect to the rotation of the rotary drum.

As discussed above, in the present embodiment, the movable member 126 as a movable portion of the parallel leaf spring 12, being composed of the first yoke 103 alone, includes no permanent magnet. That is, as shown in FIG. 11, the movable member 126 is composed only of a portion 103k as a yoke constituting the closed magnetic circuit, and a portion 103i and 103j for fixing the leaf springs 12a and 12b. Therefore, it is possible to reduce the weight of the movable member 126, and to increase the resonance frequency of the movable mechanism without increasing the spring constant of the parallel leaf spring 12.

Therefore, the present embodiment can produce, as well as the effects produced by the first embodiment, an effect of further increasing the following frequency of the dynamic tracking operation.

Figure 12:
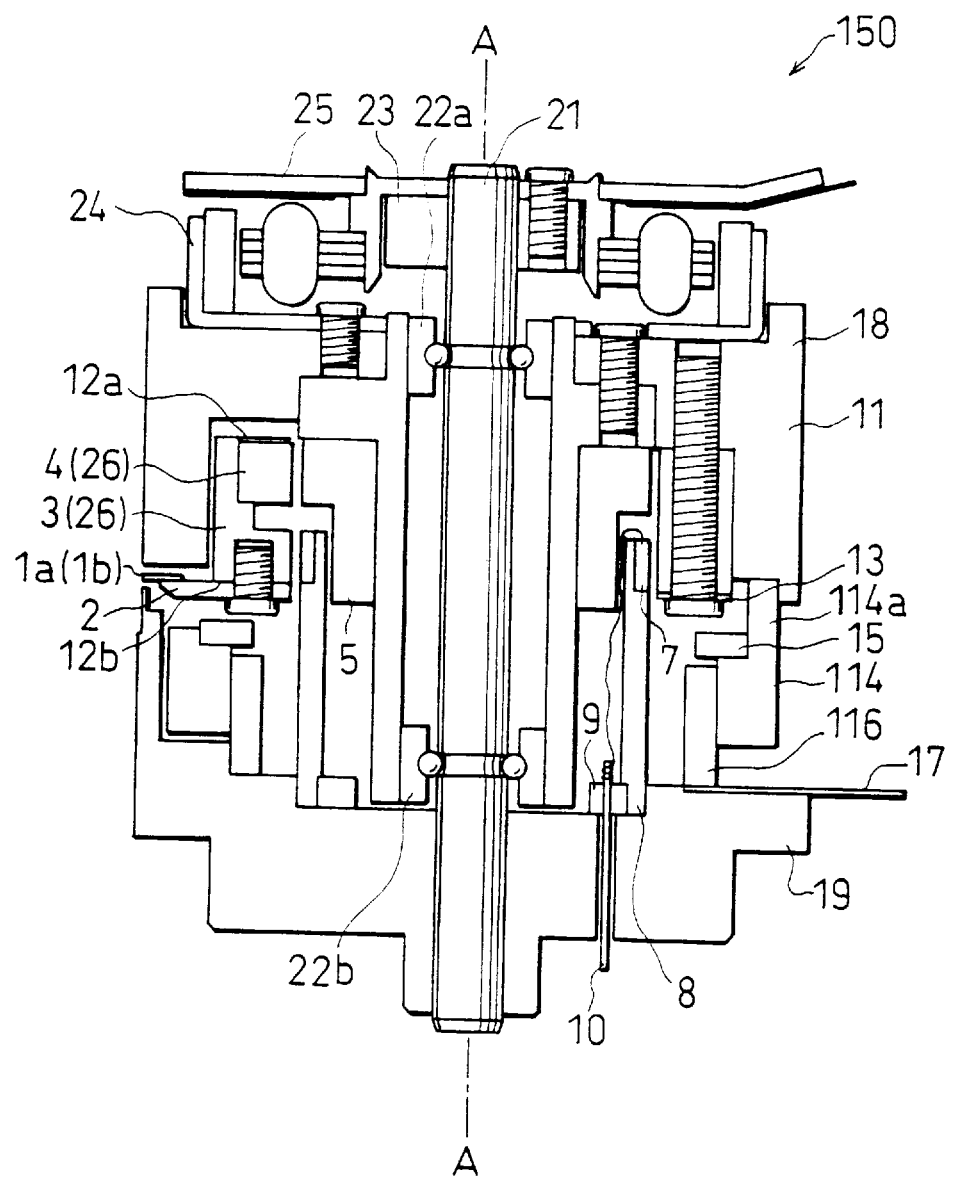
FIG. 12, illustrating even another embodiment in accordance with the present invention, is a cross-sectional view showing a configuration of a rotary head cylinder device using a rotary transformer of a circumferential surface-opposing type.
Figure 13:
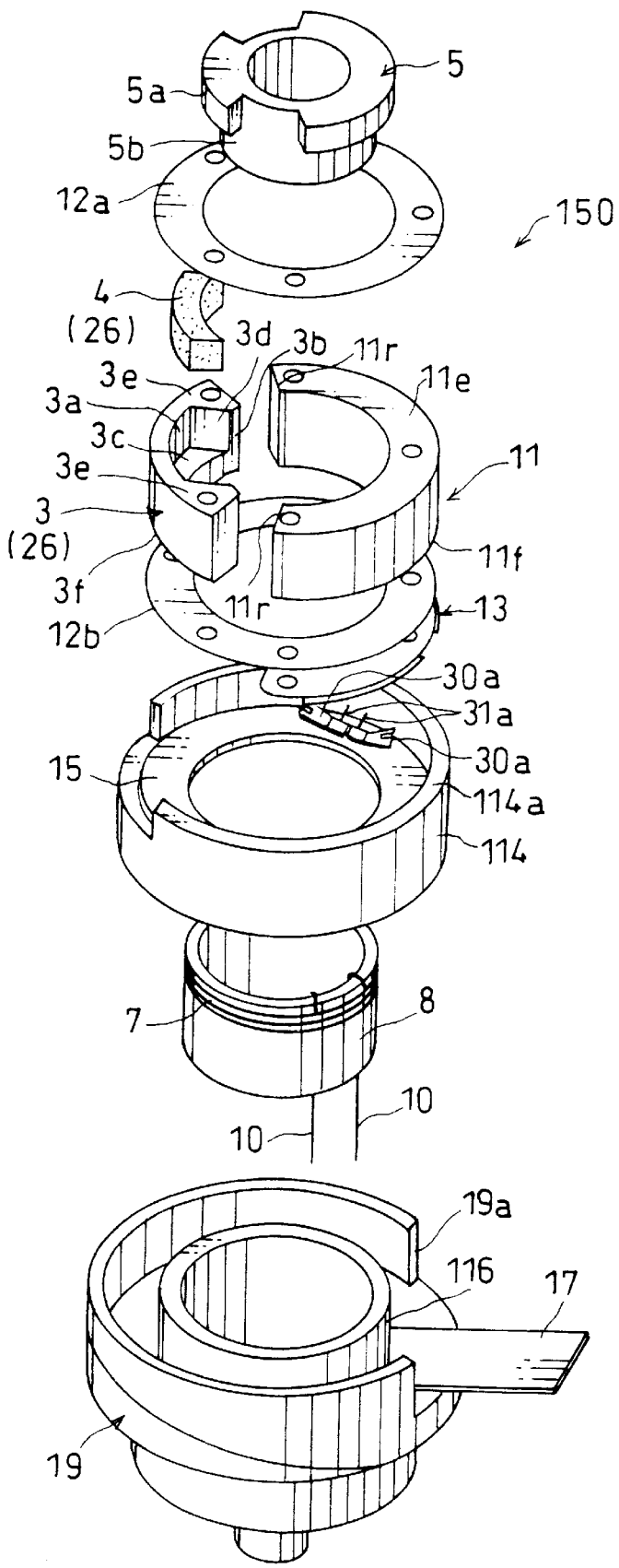
FIG. 13 is a perspective view showing a configuration of the rotary head cylinder device in a disassembled manner.
Figure 14:
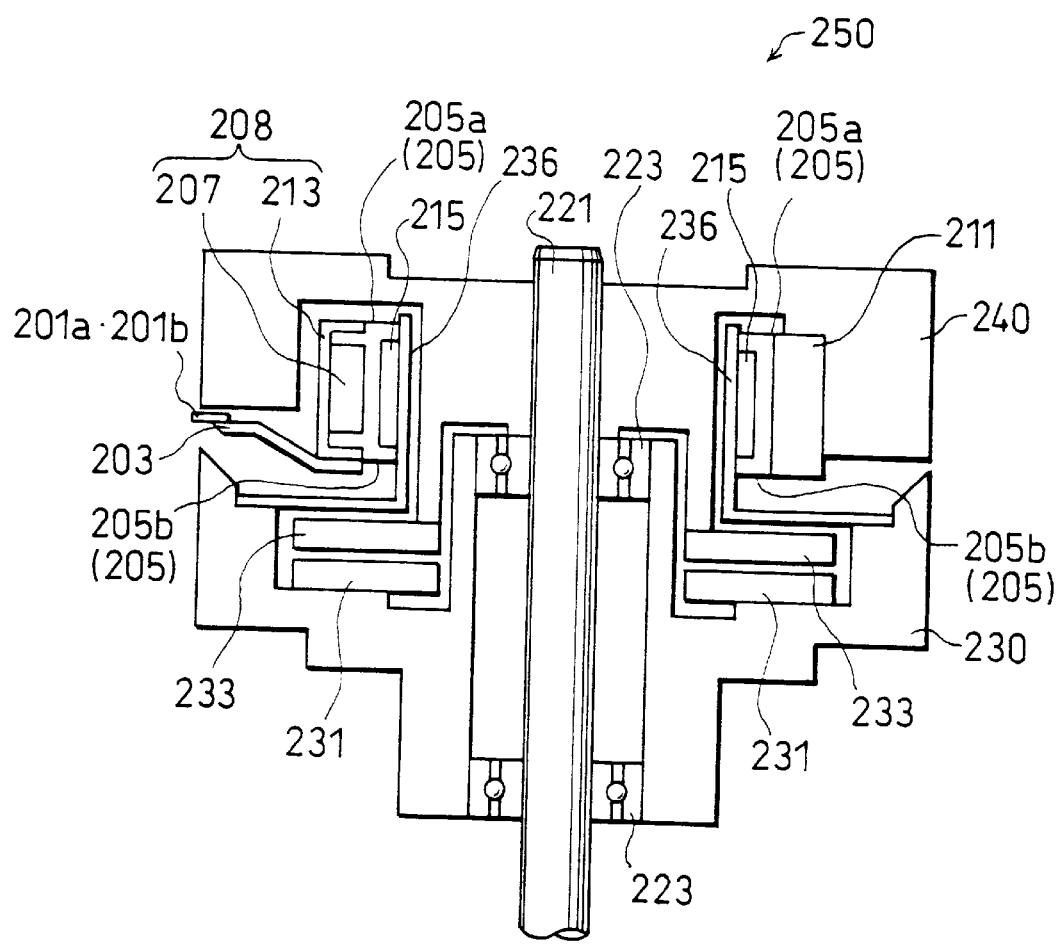
FIG. 14 is a cross-sectional view showing a configuration of a conventional rotary head cylinder device.
Figure 15:
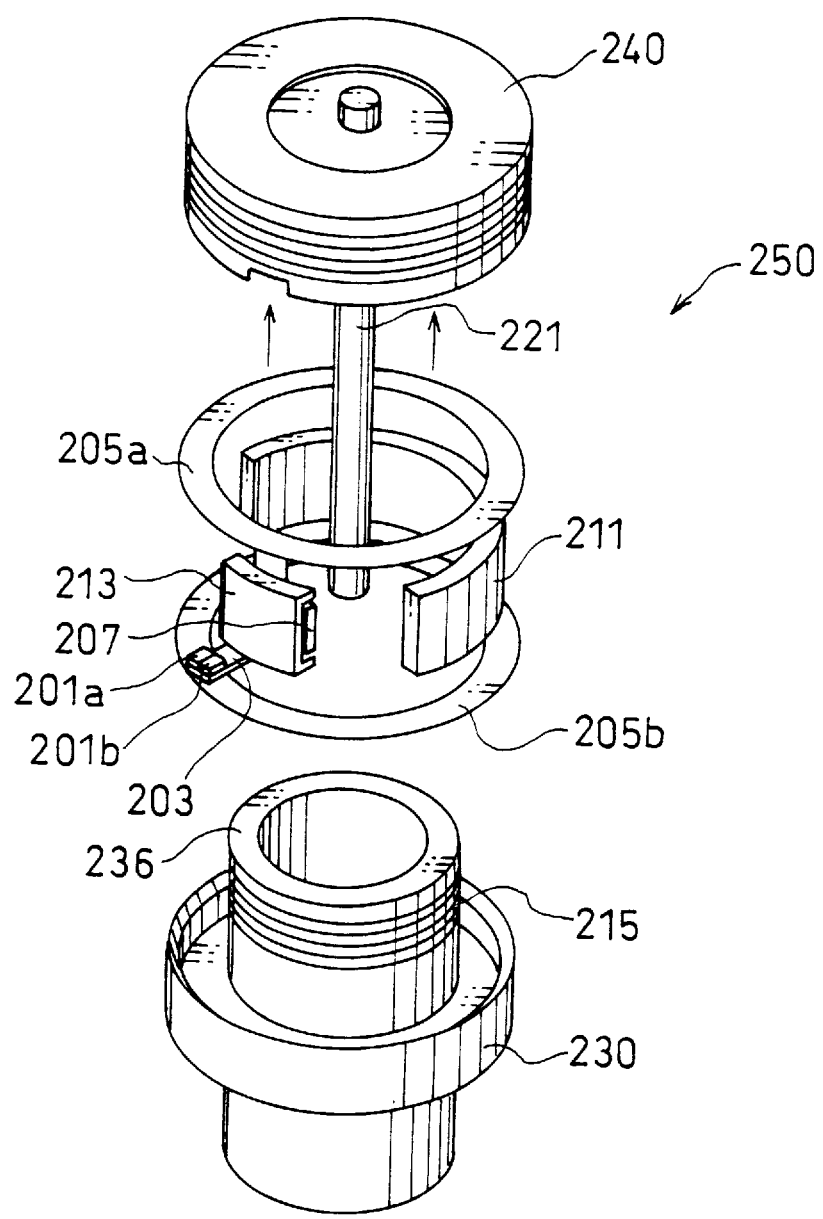
FIG. 15 is a perspective view showing a configuration of the conventional rotary head cylinder device in a dissembled manner.
Figure 16A:
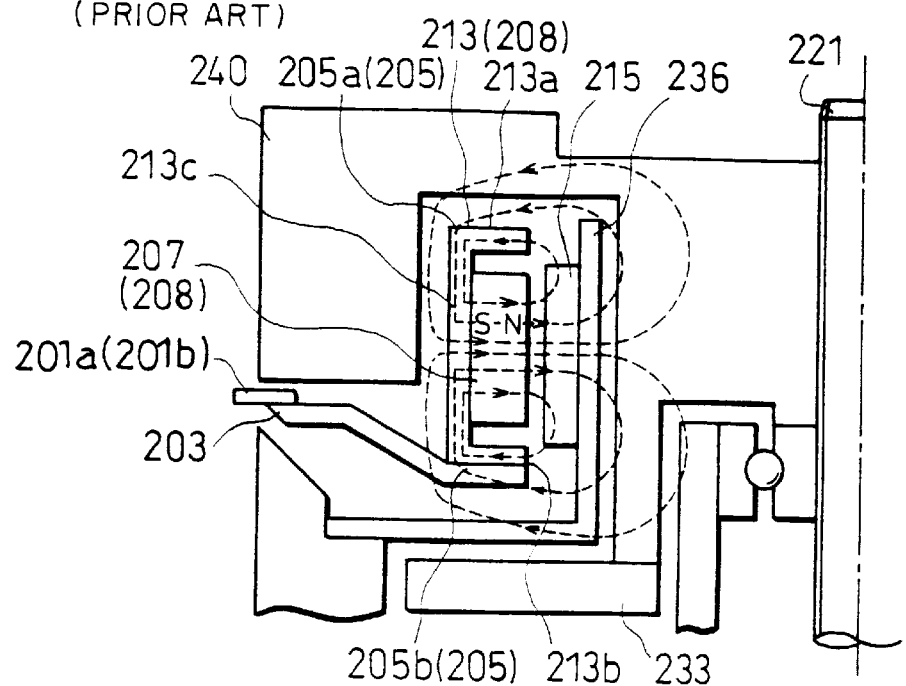
FIG. 16(a) is an explanatory drawing showing an example of a magnetic circuit of a conventional rotary head cylinder device.
Figure 16B:
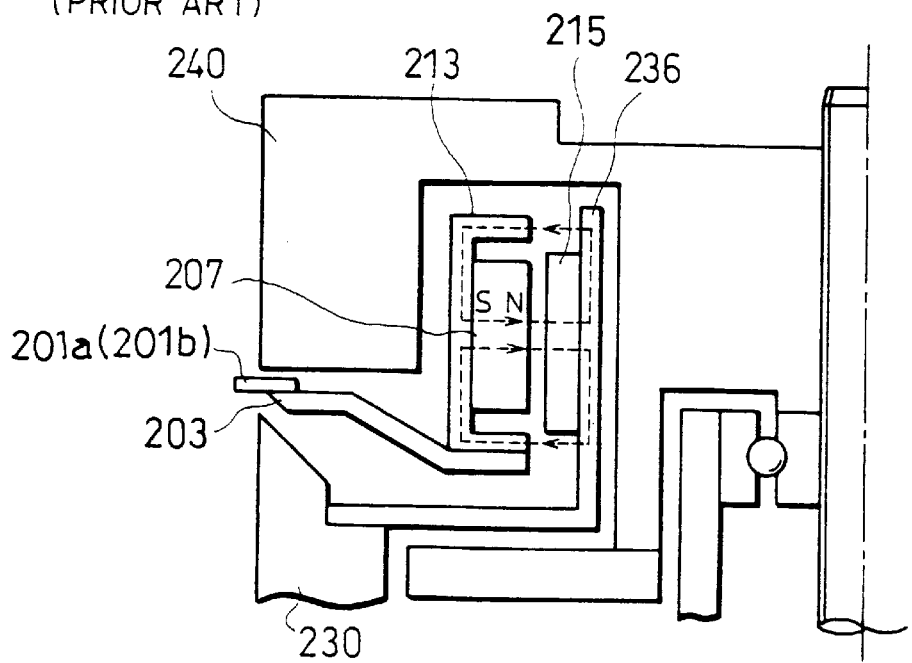
FIG. 16(b) is an explanatory drawing showing another example of a magnetic circuit of a conventional rotary head cylinder device.
Figure 17:
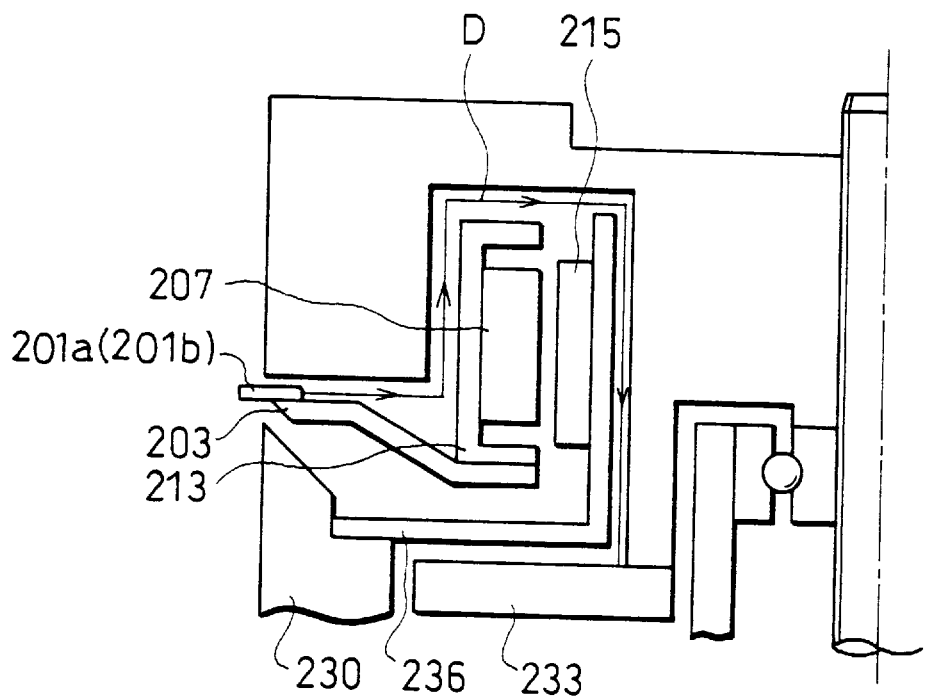
FIG. 17 is an explanatory view showing a wiring route of a conventional rotary head cylinder device.

Note that the first and second embodiments have explained the rotary transformers 14 and 16 of a plane-opposing type. However, rotary transformers of a circumferential surface-opposing type may be employed. FIG. 12 is a cross-sectional view of a rotary head cylinder device 150 having rotary transformers of a circumferential surface-opposing type instead of the rotary transformers 14 and 16 of the first embodiment. FIG. 13 is a perspective view of a disassembled main part of such a rotary head cylinder device 150.

As shown in FIGS. 12 and 13, the rotary transformers 114 and 116 of a circumferential surface-opposing type have cylinder-like shapes, and disposed so that the inner circumferential surface of the rotor side transformer 114 faces the outer circumferential surface of the stator side transformer 116.

In such a configuration, the number of channels of the rotary transformers 114 and 116 can be increased by increasing the height of the rotary head cylinder device 150, that is, by increasing the facing area of the rotary transformers 114 and 116. Therefore, it is easy to deal with an increase of the number of magnetic heads (the number of channels).

It is needless to mention that the permanent magnet, although being disposed on the top part of the first yoke in the first embodiment and on the top part of the second yoke in the second embodiment, may be disposed on the lowermost part or on the middle part thereof.

The magnetic reluctance of the magnetic circuit can be reduced by narrowing one of the two gaps in the closed magnetic circuit composed of the first and second yokes and the permanent magnet, which has no drive coil therein.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A rotary head cylinder device for recording and/or reproducing a signal with respect to a recording medium while moving a magnetic head provided to a rotor along a rotation axis of the rotor, the rotary head cylinder device comprising a fixed drum and a rotor;

wherein the rotor includes:
      a permanent magnet for generating a magnetic flux;
      a first yoke, made of a magnetic material, for supporting the magnetic head and being a part of a magnetic circuit in which the magnetic flux generated by the permanent magnet runs;
      a leaf spring for supporting the first yoke so that the first yoke can move along the rotation axis of the rotor; and
      a second yoke made of a magnetic material and fixed to the rotor so as to outwardly face the first yoke and to be separated from the first yoke by a gap, and
      wherein the fixed drum includes a drive coil fixed so that the axial line of the drive coil agrees with the rotation axis of the rotor, and so that the drive coil crosses the magnetic flux running in the magnetic circuit composed of the first and second yokes and the permanent magnet.

2. The rotary head cylinder device as defined in claim 1, wherein the leaf spring is two ring-shaped leaf springs constituting a parallel leaf spring, and the first yoke is supported by the parallel leaf spring so as to be movable along the rotation axis of the rotor.

3. The rotary head cylinder device as defined in claim 1, wherein the first yoke has a first surface, formed on an inner circumferential side of the rotor, to which the permanent magnet is fixed, and a second surface formed on an inner circumferential side of the rotor, the second yoke has a third surface facing a magnetic pole of the permanent magnet and being separated from the magnetic pole by a first gap, and also has a fourth surface facing the second surface and being separated from the second surface by a second gap, a magnetic flux generated to the magnetic circuit composed of the permanent magnet and the first and second yokes passes through the first and second gaps and thus forms a closed magnetic path, and the drive coil is disposed in the first or second gap.

4. The rotary head cylinder device as defined in claim 1, wherein the second yoke has a third surface, formed on an outer circumferential side of the rotor, to which the permanent magnet is fixed, and also has a fourth surface formed on the outer circumferential side of the rotor, the first yoke has a first surface facing a magnetic pole of the permanent magnet and being separated from the magnetic pole by a first gap, and also has a second surface facing the fourth surface and being separated from the fourth surface by a second gap, a magnetic flux generated to the magnetic circuit composed of the permanent magnet and the first and second yokes passes through the first and second gaps and thus forms a closed magnetic path, and the drive coil is disposed in the first or second gap.

5. The rotary head cylinder device as defined in claim 3, wherein the first and second yokes are formed so that one of the first and second gaps, in which the drive coil is not provided, is narrower than the other.

6. The rotary head cylinder device as defined in claim 4, wherein the first and second yokes are formed so that one of the first and second gaps, in which the drive coil is not provided, is narrower than the other.

7. The rotary head cylinder device as defined in claim 1, wherein the rotor further includes a rotor side transformer electrically connected to the magnetic head, and wherein the fixed drum further includes a stator side transformer provided so as to face the rotor side transformer, the rotor side transformer being fixed to the rotor on the outer circumferential side of the drive coil.

8. The rotary head cylinder device as defined in claim 7, wherein the rotor further includes:
   a rotor side transformer electrically connected to the magnetic head; and
   a stator side transformer provided so as to face the rotor side transformer,
wherein the rotor and stator side transformers are formed in cylinder-like shapes having the rotation axis of the rotor as the centers thereof, and
an inner surface of one of the rotor and stator side transformers and an outer surface of the other transformer face each other.

9. The rotary head cylinder device as defined in claim 1, wherein the rotary head cylinder device reads information recorded on a magnetic tape.

10. An apparatus, comprising a rotary head cylinder device for recording and/or reproducing a signal with respect to a recording medium while moving a magnetic head provided to a rotor along a rotation axis of the rotor, the rotary head cylinder device comprising a fixed drum and a rotor, wherein the rotor includes:
   a permanent magnet for generating a magnetic flux;
   a first yoke, made of a magnetic material, for supporting the magnetic head and being a part of a magnetic circuit in which the magnetic flux generated by the permanent magnet runs;
   a leaf spring for supporting the first yoke so that the first yoke can move along the rotation axis of the rotor; and
   a second yoke made of a magnetic material and fixed to the rotor so as to outwardly face the first yoke and to be separated from the first yoke by a gap, and wherein the fixed drum includes a drive coil fixed so that the axial line of the drive coil agrees with the rotation axis of the rotor, and so that the drive coil crosses the magnetic flux running in the magnetic circuit composed of the first and second yokes and the permanent magnet.

11. The apparatus comprising the rotary head cylinder device as defined in claim 10, wherein the leaf spring is two ring-shaped leaf springs constituting a parallel leaf spring, and the first yoke is supported by the parallel leaf spring so as to be movable along the rotation axis of the rotor.

12. A rotary head cylinder device, comprising a fixed drum section and a rotary drum section, the fixed drum section including a drive coil, the rotary drum section including a magnetic head and a magnetic circuit, wherein the magnetic circuit includes a yoke section, the yoke section includes a movable section and a fixed section, the movable section being capable of moving along a rotation axis of the rotary drum section, the fixed section being fixed to the rotary drum section, and the magnetic head is supported by the movable section, and said drive coil is located to cross the magnetic flux running in the magnetic circuit.

13. The rotary head cylinder device as defined in claim 12, wherein the magnetic circuit includes a permanent magnet.

14. The rotary head cylinder device as defined in claim 12, wherein the movable section of the yoke section is supported by the rotary drum section via a flat spring.

15. The rotary head cylinder device as defined in claim 12, wherein the movable section and the fixed section of the yoke section form a magnetic gap, and the drive coil is disposed in a space in the magnetic gap.

* * * * *